Jan. 19, 1954  O. C. KELLY  2,666,364
MIRROR MOUNTING MEANS
Filed March 15, 1950
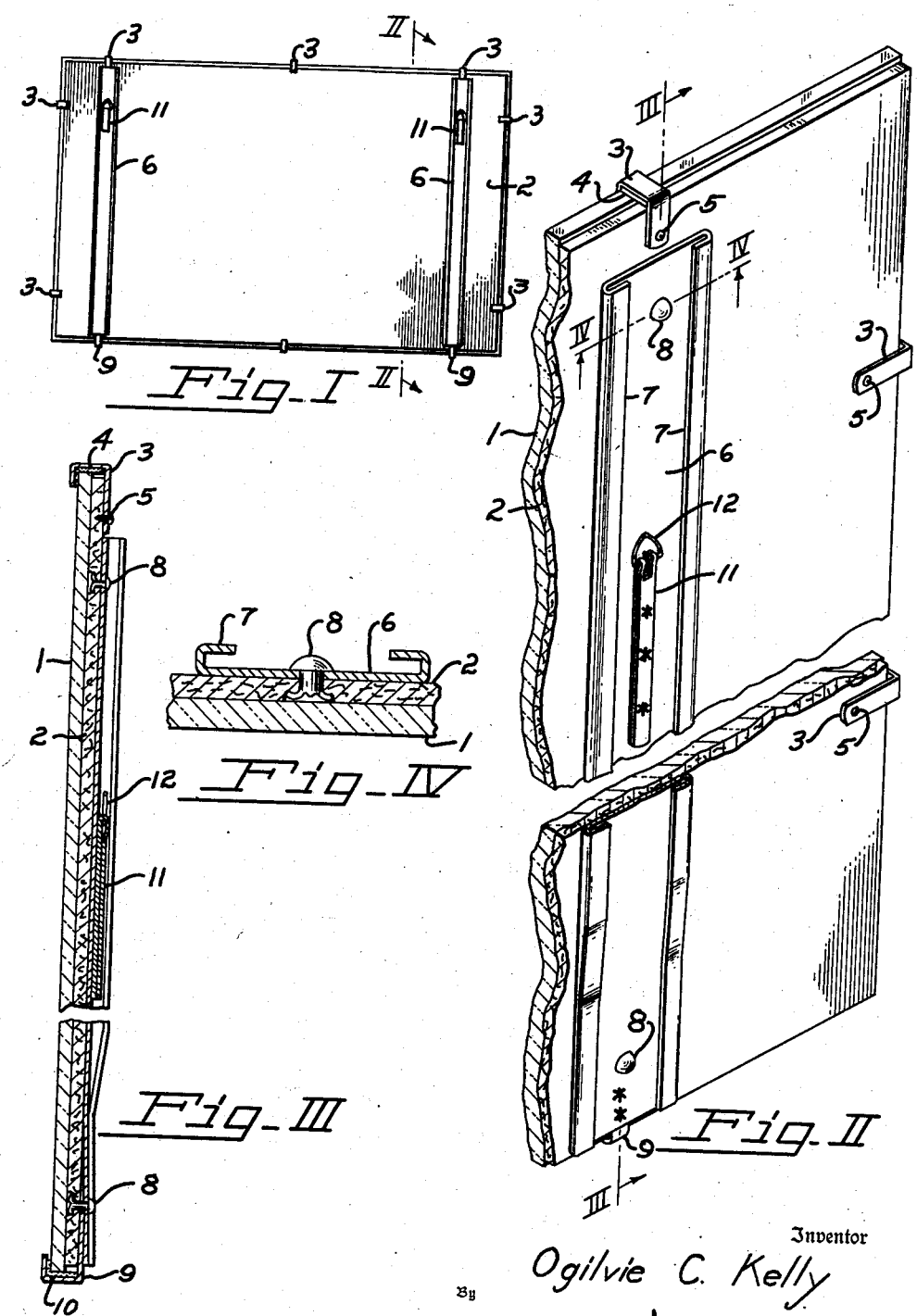
Inventor
Ogilvie C. Kelly
By Marshall and Marshall
Attorneys Patented Jan. 19, 1954

2,666,364

UNITED STATES PATENT OFFICE 2,666,364

MIRROR MOUNTING MEANS

Ogilvie C. Kelly, Toledo, Ohio, assignor to The Toledo Plate & Window Glass Company, Toledo, Ohio, a corporation of Ohio Application March 15, 1950, Serial No. 149,756

3 Claims. (Cl. 88—97)

The instant invention relates to mirrors of the type that is adapted to be hung by means of "picture wire" or the like from moldings or to be removably supported on fastening devices such as hooks, screws or nails.

Large mirrors as heretofore constructed could not be readily hung. It was usually necessary to have them installed by skilled persons capable of preparing wall surfaces to receive them. One of the objects of the instant invention is to provide means by which mirrors of comparatively large size and great weight can be reliably supported from picture moldings or from hooks or screws which can be put in place by unskilled persons.

Another object of the invention is to provide a mirror backing and support which is economical to construct and neat in appearance.

A further object is to provide a mirror with hanging means and a backing board interposed between the mirror and the hanging means, the mirror nevertheless being supported directly by the hanging means.

A still further object is to provide an economically constructed mirror having concealed metallic hanging means and a fibrous backing board interposed between the silvered back of the mirror and the metallic hanging means, the construction being such that the silvered back of the mirror is not touched by the metal of the hanging means, so that there is no liability of electrolitic action which might damage the silver reflecting surface.

Still a further object is to provide a mirror hanging means adapted to be supported by picture wire or the like and which is so constructed that the hanging means supports the lower edge of the mirror with the parts along the lower edge of the mirror spaced from the wall against which the mirror is hung, whereby abrasion along the wall adjacent the lower edge of the mirror is avoided even though the mirror may swing from side to side.

These and other objects and advantages will be more clearly understood by reference to the drawings, in which:

Figure I is a back view of a mirror of the instant invention.

Figure II is an enlarged fragmentary perspective view showing the rear side of one end of the mirror of the instant invention, an intermediate part being broken out to foreshorten the figure.

Figure III is a view in section, taken as indicated by line III—III of Figure II, Figure III being on a scale somewhat smaller than the scale of Figure II, Figure III also having an intermediate part broken out to foreshorten the figure.

Figure IV is a much enlarged fragmentary sectional view taken as indicated by the line IV—IV of Figure II.

The mirror of the instant invention includes a sheet of glass 1, the back of which is silvered and then covered with a protective coat of paint. Overlying the silvered and painted back of the sheet of glass 1 is a layer of fiberboard 2, the area of which is slightly less than the area of the sheet of glass 1, the layer of fiberboard being connected to the sheet of glass 1 by means of metal clips 3. Felt pads 4 are interposed between the metal clips 3 and the edges of the sheet of glass 1 and the clips 3 are so located upon and attached to the fiberboard 2, by means of short screws 5 which do not extend through the layer of fiberboard, as to hold the edges of the fiberboard slightly within the margin of the sheet of glass 1.

Sheet metal strips 6, each having its lateral edges 7 turned inwardly, are secured to the back of the layer of fiberboard 2 by means of rivets 8 having prongs that are sunk below the inner surface of the fiberboard, and spot welded or otherwise secured to the lower end of each strip 6 is a hook 9 which receives the lower edge of the sheet of glass 1, a felt pad 10 being interposed between the hook 9 and the lower edge of the sheet of glass.

It will be observed that because the screws 5 do not extend through the layer of fiberboard 2, because the rivets 8 have their prongs sunk into the fiberboard and because of the interposition of the felt pads 4 between the clips 3 and the edges of the sheet of glass 1, and of the felt pads 10 between the hooks 9 and the lower edge of the sheet of glass, no metal touches the silver and painted back of the sheet of glass to create a liability of electrolitic action and no metal contacts the edges of the sheet of glass to cause liability of chipping.

Spot welded to each of the sheet metal strips 6 and lying between the inturned edges 7 is a hinge strip 11 and pivoted at the upper edge of each hinge strip 11 is a loop 12 to which picture wire or the like may be attached. Because of the fact that the loop 12 is pivoted, a pulling force exerted on the loop at an angle to the direction in which the sheet metal strip 6 extends does not tend to damage the connection between the loop 12 and the hinge strip 11.

The portions of the inturned edges 7 which are adjacent the lower ends of the sheet metal strips 6 are pressed into close proximity to the bodies of the strips. Hence a wall along the lower edge of the mirror is not touched by the sheet metal strips 6 or their inturned edges. The intermediate portions of the inturned edges 7 engage the wall and hold the ends of the strips and the clips 3 and screws 5 away from the wall, thus preventing the wall from being scratched adjacent the edges of the mirror.

A mirror constructed in accordance with the instant invention can be hung by means of picture wire or the like either from a picture molding or from hooks, screws or nails which may project from the wall behind the mirror and which need not be accurately placed since the picture wire need not extend vertically.

The loops 12, the hinge strips 11, the sheet metal strips 6 and the hooks 9 support the heavy glass directly. Hence there is no force acting to tear fastenings out of the fiberboard. It is practicable for an unskilled person to hang mirrors the dimensions of which are as much as 3 x 5 feet or more. Therefore, mirrors of this size as well as mirrors of smaller sizes not only may be marketed where skilled installers are not available but their low cost of construction and their freedom from the burden of an installation cost make them available where outlay required for more expensive construction and installation charges would not be justified.

The embodiment of the invention herein shown and described is to be regarded as illustrative only and it is to be understood that the invention is susceptible to variation, modification and change within the spirit and scope of the subjoined claims.

Having described the invention, I claim:

1. Mirror mounting means adapted to be utilized for mounting heavy mirrors of various widths and heights comprising, in combination, flexible fiber board cut to approximately the dimensions of a mirror to be mounted, metal strips adapted to be employed in pairs, each strip being secured independently to a sheet of said flexible fiber board in position to extend upwardly from the lower edge thereof at any selected distance from the other strip, a hook secured to the lower end of each of said strips and adapted to extend around the lower edge of the sheet of fiber board to which the strip is secured and to encompass the lower edge of a mirror, a plurality of clips each of which is independently secured to the sheet of flexible fiber board adjacent its upper and lateral edges at any selected distance from the others of said clips, whereby identical strips and clips are usable to mount mirrors of widths and heights varying from each other to any desired extent, the flexibility of said fiberboard being such that said hooks and clips bend said fiberboard to bring its edges into conformity with the edges of the mirrors without setting up strains that increase the liability of the mirror to breakage, and hangers secured to said strips above the mid points thereof to which supporting elements may be attached.

2. Mirror mounting means adapted to be utilized for mounting heavy mirrors of various widths and heights comprising, in combination, flexible fiber board cut to approximately the dimensions of a mirror to be mounted, sheet metal strips adapted to be employed in pairs, each strip being secured independently to a sheet of said flexible fiber board in position to extend upwardly from the lower edge thereof at any selected distance from the other strip, a hook secured to the lower end of each of said strips and adapted to extend around the lower edge of the sheet of fiber board to which the strip is secured and to encompass the lower edge of a mirror, a plurality of clips each of which is independently secured to the sheet of flexible fiber board adjacent its upper and lateral edges at any selected distance from the others of said clips, whereby identical strips and clips are usable to mount mirrors of widths and heights varying from each other to any desired extent, the flexibility of said fiber board being such that said hooks and clips bend said fiber board to bring its edges into conformity with the edges of the mirrors without setting up strains that increase the liability of the mirror to breakage, and hangers secured to said strips above the mid points thereof to which supporting elements may be attached, the lateral edges of said strips being rolled inwardly to strengthen said strips and to provide rounded surfaces to engage walls and to hold the hooks and clips away from such walls and thus prevent gouging and abrasion thereof.

3. Mirror mounting means adapted to be utilized for mounting heavy mirrors of various widths and heights comprising, in combination, flexible fiber board cut to approximately the dimensions of a mirror to be mounted, sheet metal strips adapted to be employed in pairs, each strip being secured independently to a sheet of said flexible fiber board in position to extend upwardly from the lower edge thereof at any selected distance from the other strip, a hook secured to the lower end of each of said strips and adapted to extend around the lower edge of the sheet of fiber board to which the strip is secured and to encompass the lower edge of a mirror, a plurality of clips each of which is independently secured to the sheet of flexible fiber board adjacent its upper and lateral edges at any selected distance from the others of said clips, whereby identical strips and clips are usable to mount mirrors of widths and heights varying from each other to any desired extent, the flexibility of said fiberboard being such that said hooks and clips bend said fiber board to bring its edges into conformity with the edges of the mirrors without setting up strains that increase the liability of the mirror to breakage, and hangers secured to said strips above the mid points thereof to which supporting elements may be attached, the lateral edges of said strips being rolled inwardly to strengthen said strips and to provide rounded surfaces to engage walls and to hold the hooks and clips away from such walls and thus prevent gouging and abrasion thereof, portions of the inwardly rolled edges of said strips at their lower ends being flattened over said strips to position such portions out of engagement with walls.

OGILVIE C. KELLY.

References Cited in the file of this patent

UNITED STATES PATENTS

| Number | Name | Date |
|---|---|---|
| 437,949 | Talcott | Oct. 7, 1890 |
| 911,568 | Bickford | Feb. 9, 1909 |
| 2,016,942 | Hewitt et al. | Oct. 8, 1935 |
| 2,469,923 | Jones | May 10, 1949 |